United States Patent [19]

Sarovich

[11] 4,078,654
[45] Mar. 14, 1978

[54] FLEXIBLE COATED WIRE CABLE CONVEYOR STRUCTURE

[75] Inventor: Steve Sarovich, Oak Brook, Ill.

[73] Assignee: The Sardee Corporation, Alsip, Ill.

[21] Appl. No.: 684,930

[22] Filed: May 10, 1976

[51] Int. Cl.² .............................................. B65G 15/36
[52] U.S. Cl. .................................... 198/844; 198/804
[58] Field of Search ............... 198/793, 795, 797, 804, 198/822, 844, 847, 850, 866, 688

[56] References Cited

U.S. PATENT DOCUMENTS

| 2,743,005 | 4/1956 | Rollins | 198/848 |
|---|---|---|---|
| 2,818,962 | 1/1958 | Hörth | 198/822 |
| 2,824,639 | 2/1958 | Rosendahl | 198/793 |
| 2,954,113 | 9/1960 | Hibbard et al. | 198/851 |
| 3,311,222 | 3/1967 | Crawford et al. | 198/822 |
| 3,315,788 | 4/1967 | Anderson | 198/688 |
| 3,339,712 | 9/1967 | Anderson | 198/848 |
| 3,643,792 | 2/1972 | Resener | 198/844 |
| 3,653,494 | 4/1972 | Miller | 198/850 |
| 3,666,082 | 5/1972 | Riggs | 198/844 |
| 3,679,050 | 7/1972 | Anderson et al. | 198/688 |
| 3,865,229 | 2/1975 | Velander | 198/847 |
| 3,870,141 | 3/1975 | Lapeyre et al. | 198/853 |
| 3,910,404 | 10/1975 | Henrekson | 198/852 |
| 3,944,059 | 3/1976 | Garvey | 198/850 |
| 3,967,721 | 7/1976 | Rhoden | 198/844 |

FOREIGN PATENT DOCUMENTS

| 641,319 | 4/1928 | France | 198/844 |
|---|---|---|---|
| 2,149,971 | 2/1973 | Germany | 198/850 |

Primary Examiner—Evon C. Blunk
Assistant Examiner—Richard K. Thomson
Attorney, Agent, or Firm—Charles B. Cannon

[57] ABSTRACT

A flexible coated wire cable conveyor structure which includes one or more flexible wire cables coated with a flexible plastic resinous cable-coating material, such as nylon, and novel means for attaching the conveyor flights to and supporting them on the flexible coated wire cable or cables including flight-attaching and supporting members integrally united, as by molding or heat-bonding to the flexible plastic resinous cable-coating material on the flexible coated wire cable or cables and for attaching the conveyor flights to and supporting them on the flexible coated wire cable or cables. In a preferred embodiment thereof, the invention includes means for detachably latching the conveyor flights to the flight-attaching and supporting members.

14 Claims, 32 Drawing Figures

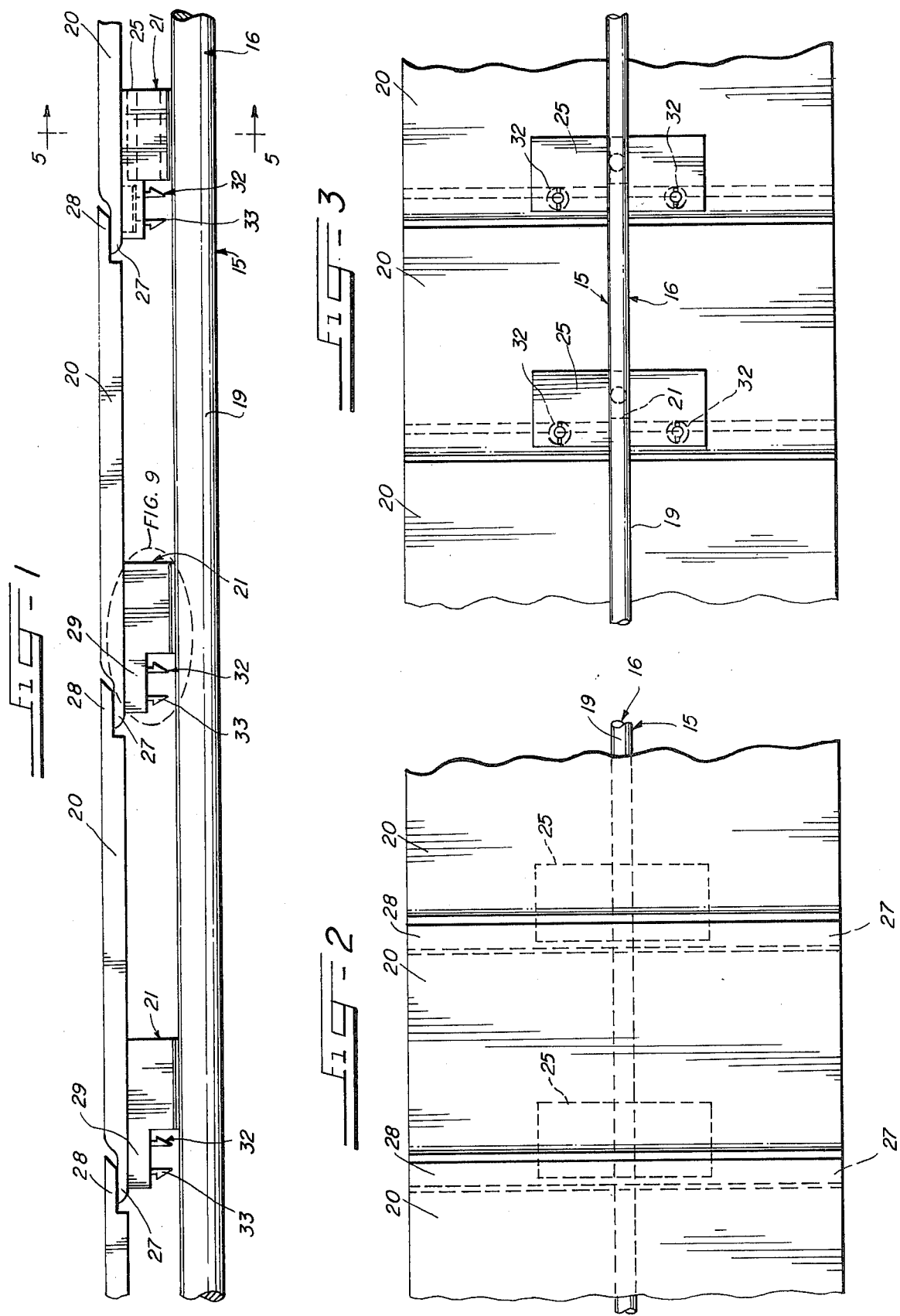

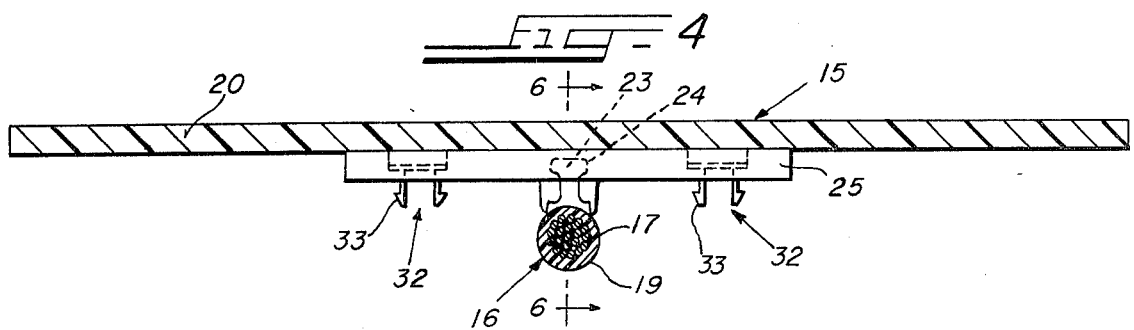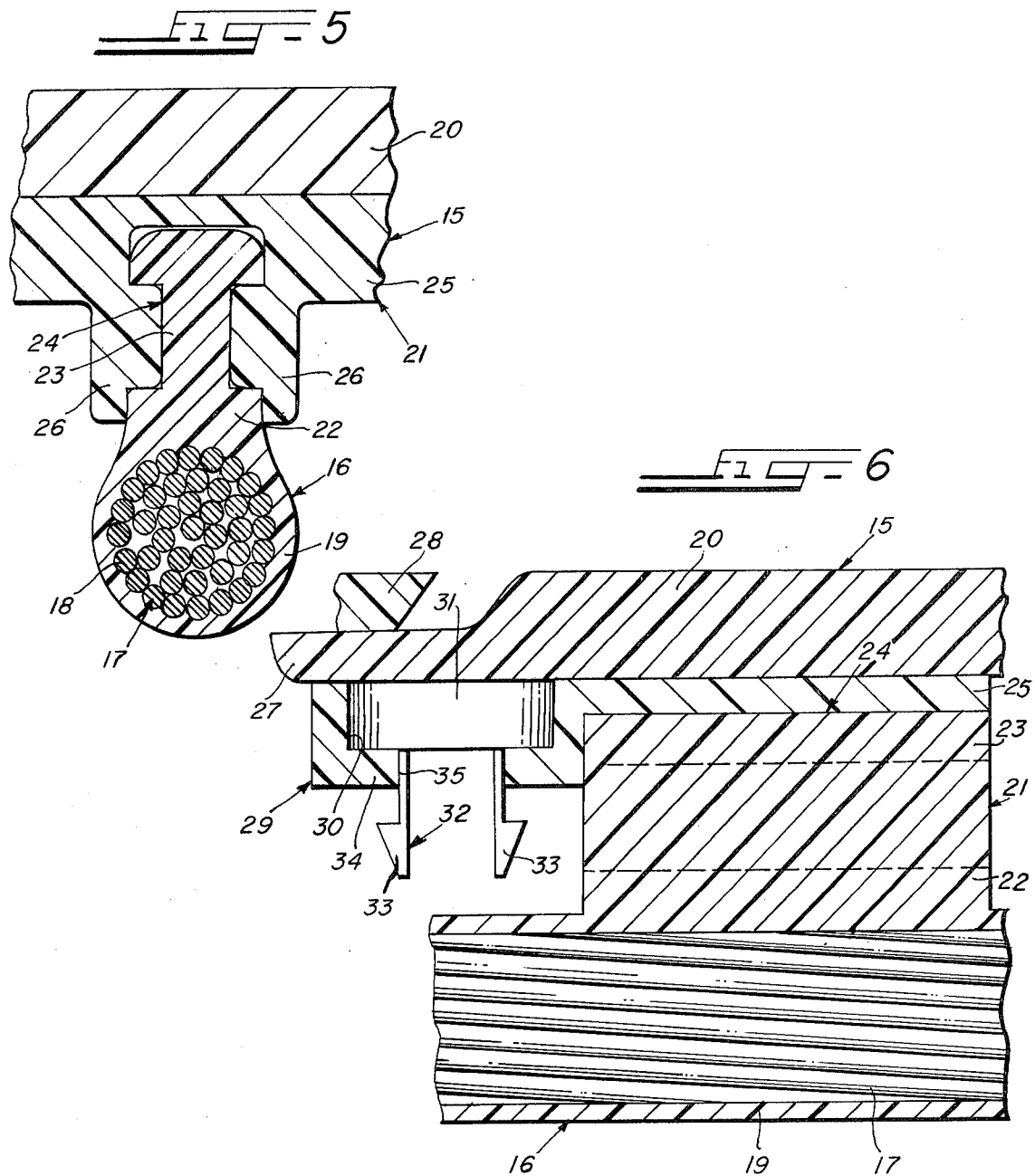

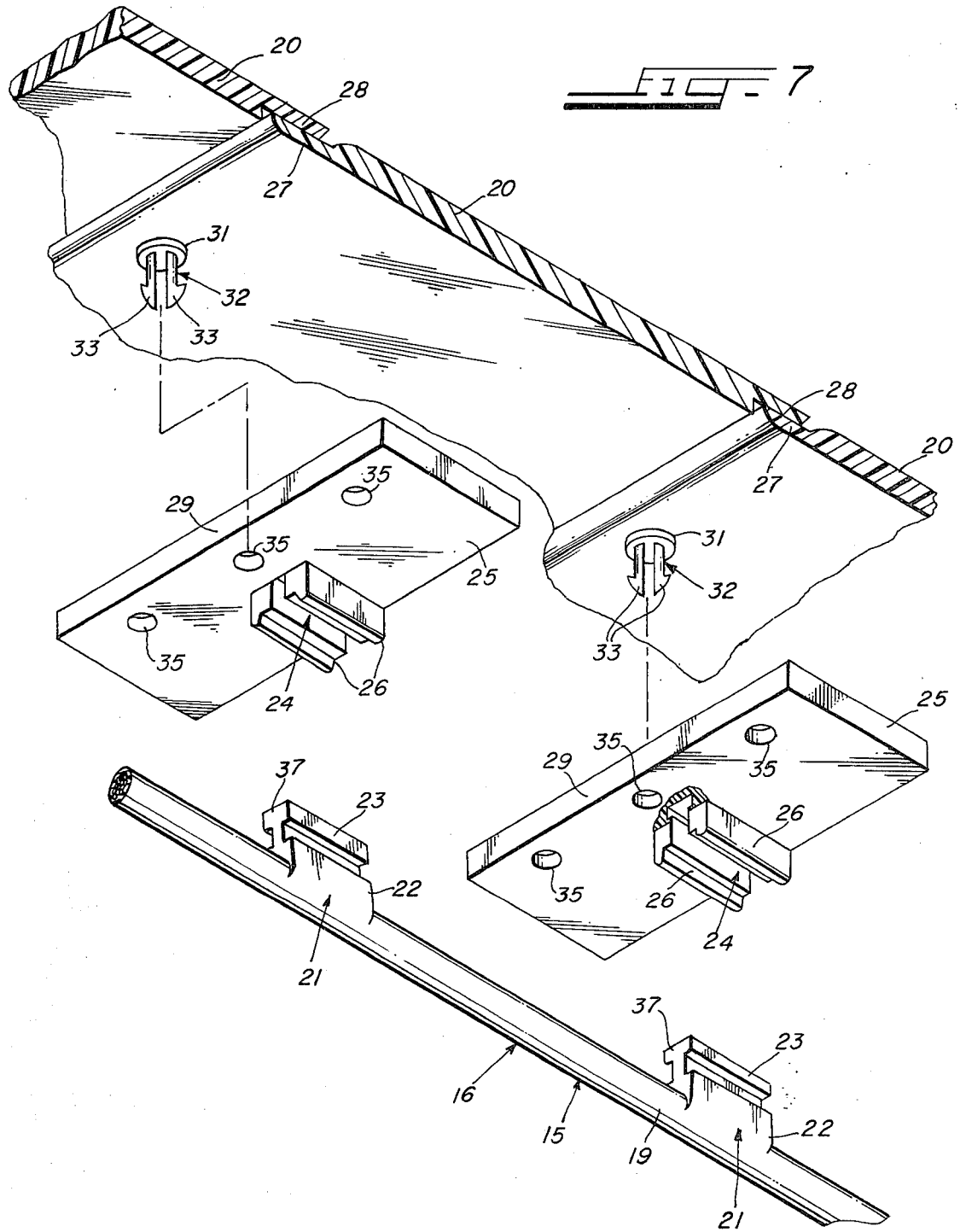

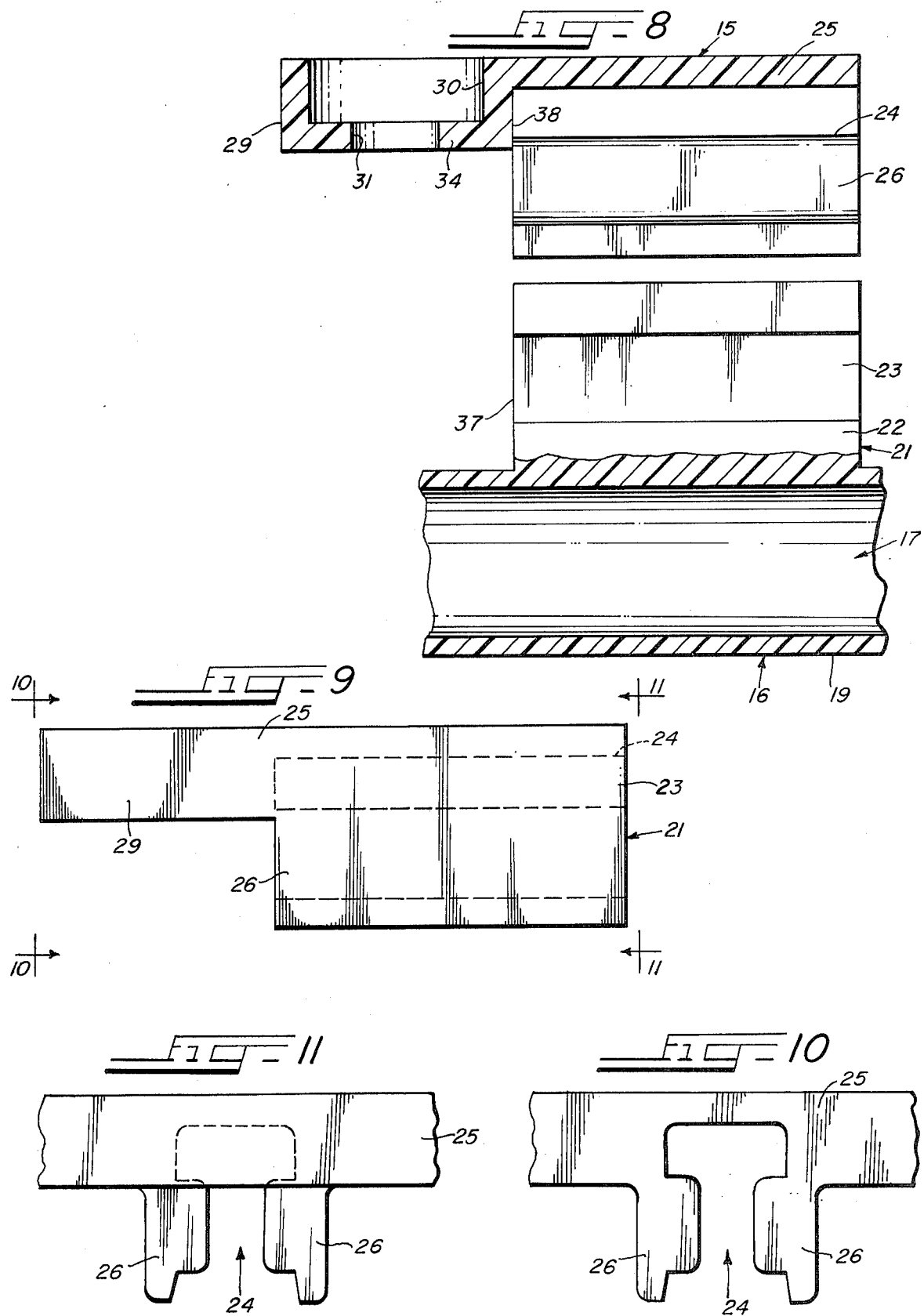

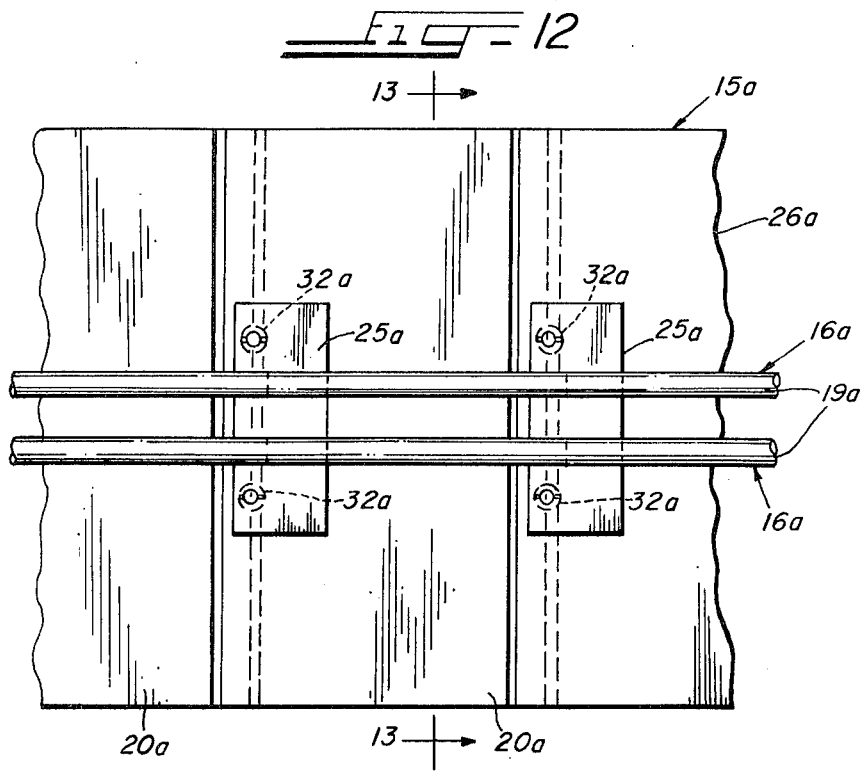
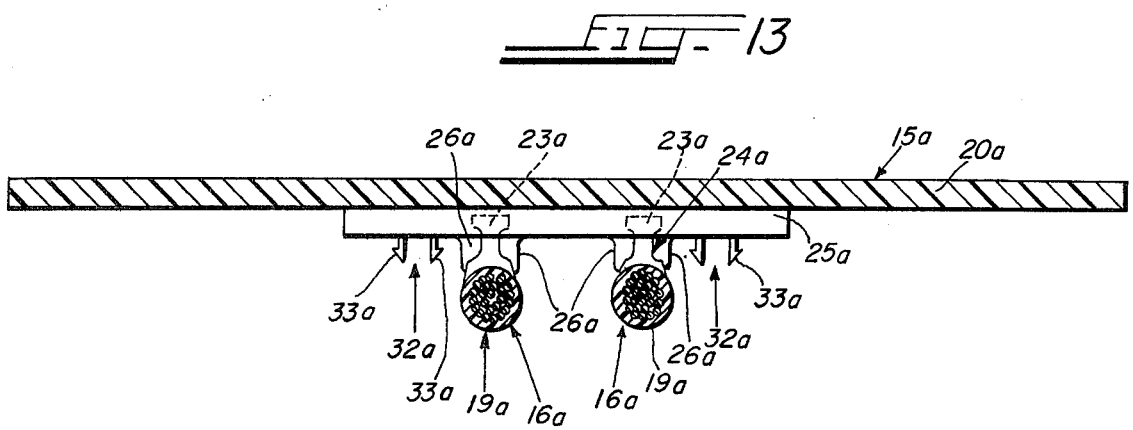

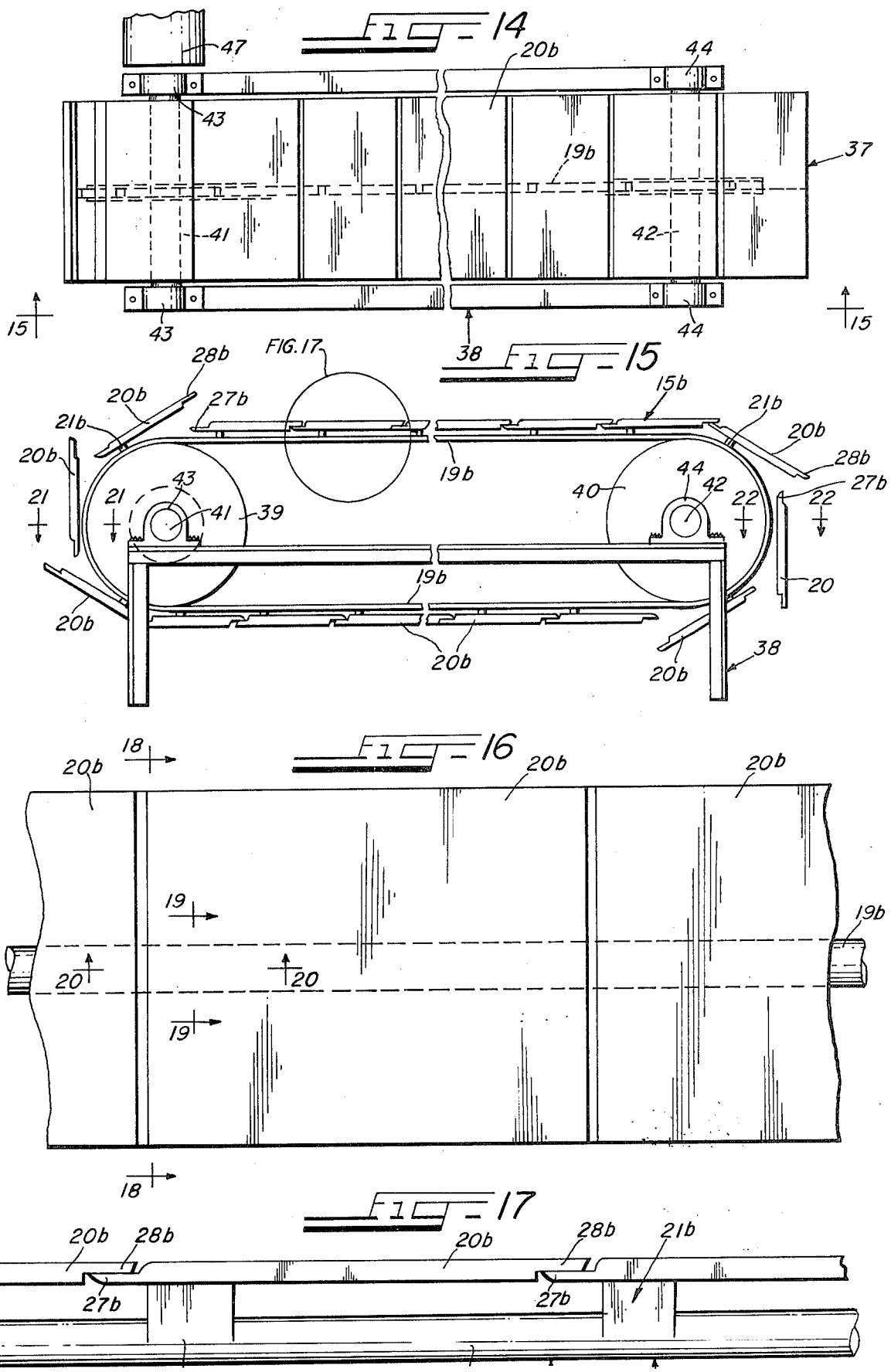

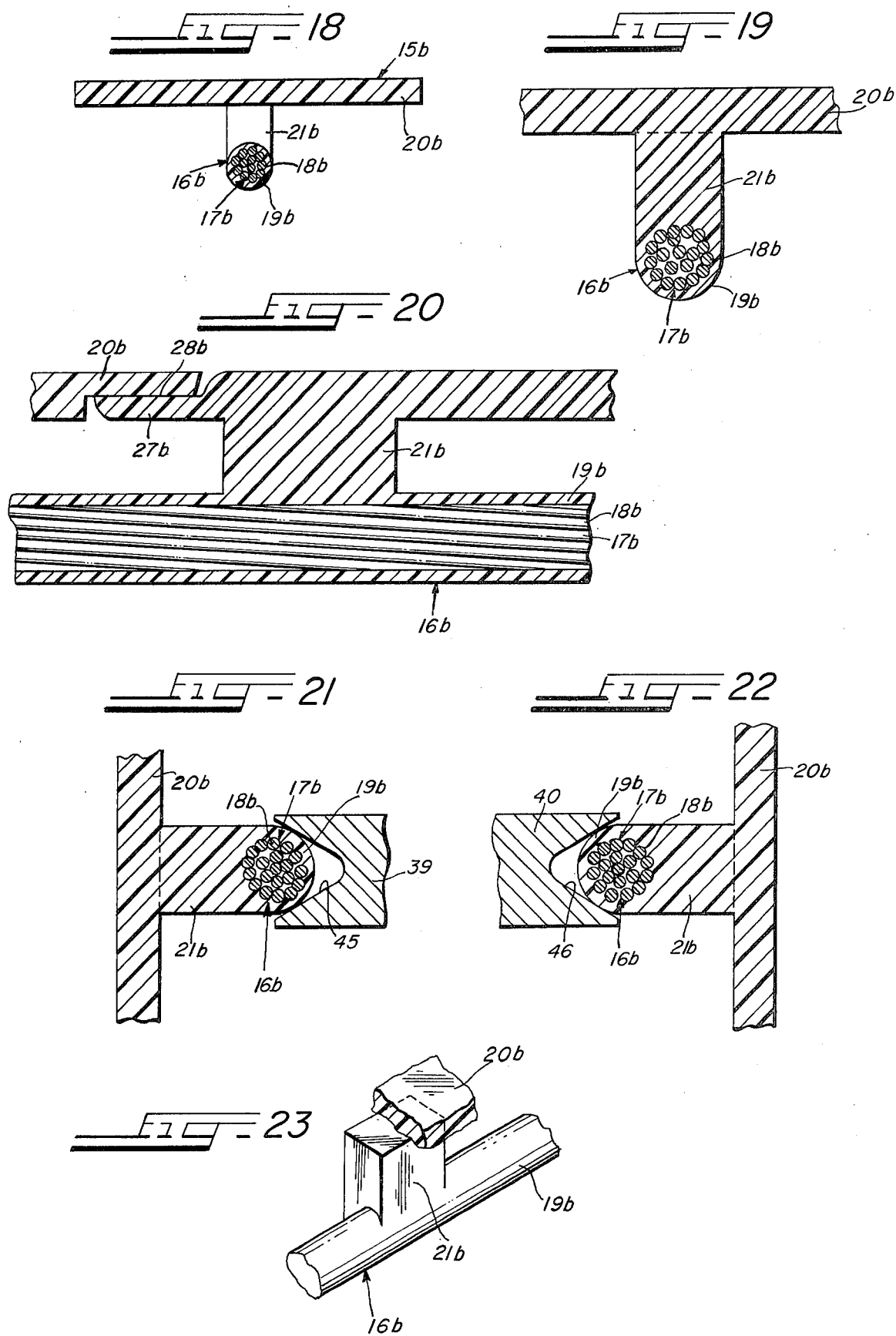

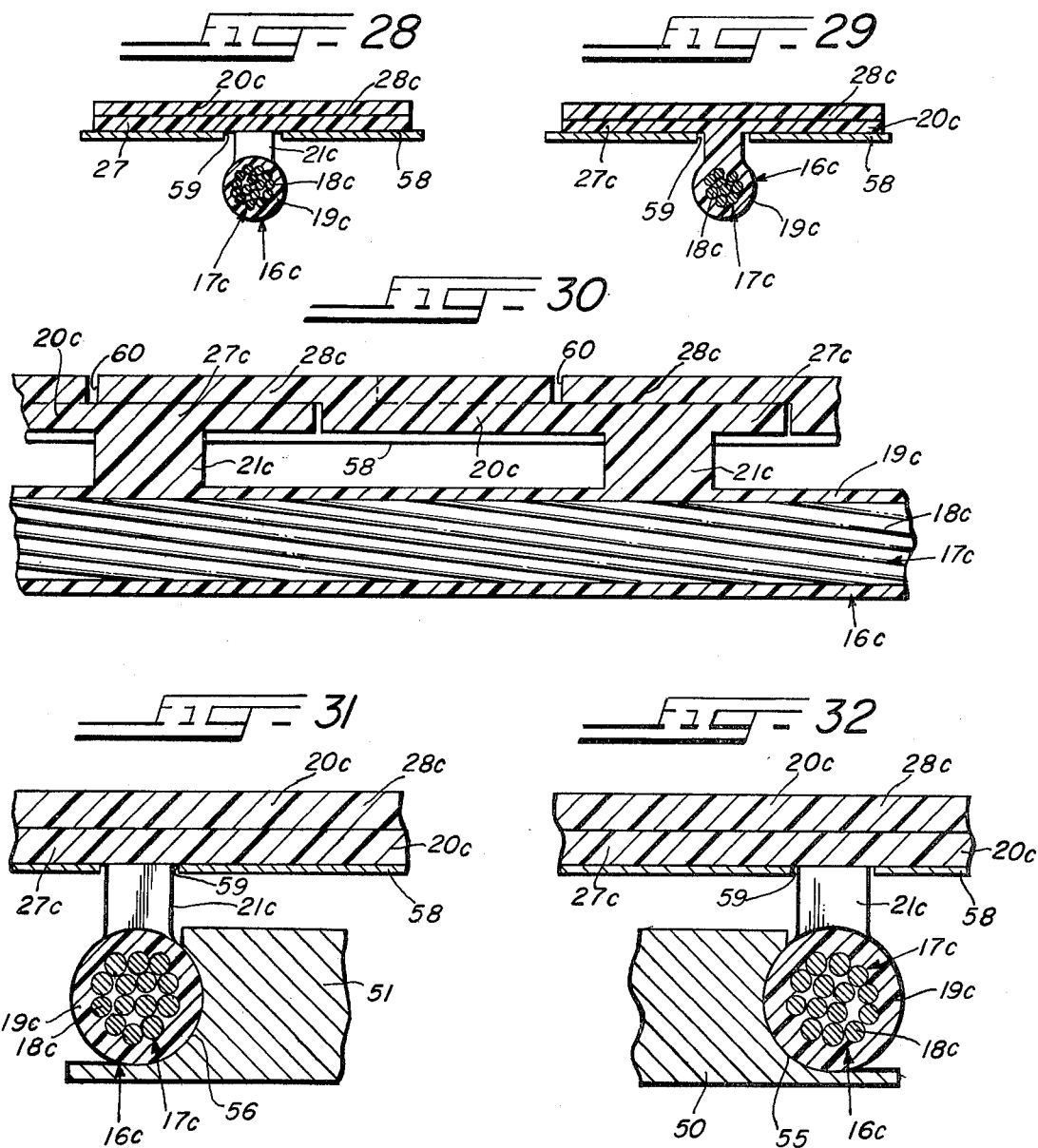

FLEXIBLE COATED WIRE CABLE CONVEYOR STRUCTURE

BACKGROUND OF THE INVENTION

Conveyor structures employing flexible wire cables are well known in the art including flexible wire cables coated with a plastic resinous coating, such as nylon.

However, one of the problems which has been experienced in the use of such prior coated flexible wire cables coated with a flexible plastic resinous coating, such as nylon, has been the problem of attaching the conveyor flights to the coated flexible wire cable or cables without damaging the coating on the flexible coated wire cable while, at the same time, providing an adequate grip of the flight-attaching and supporting means for the conveyor flights on the coated flexible wire cable without slipping . The present invention is directed to a solution of and overcomes this and related problems.

Conveyor structures have likewise been known and used heretofore which embody conveyor flights molded of plastic resinous material and with the molded plastic resinous flights interconnected and driven by sprocket chains, or the like. However, one of the problems which have been encountered in the use of such prior conveyor structures embodying molded plastic resinous conveyor flights and chain drives therefor is that, because of their great weight and resulting shipping expense, such prior conveyor structures are limited in use to relatively short lengths such, for example, as 20 feet, as well as in the overall size thereof, including the width and length of the individual conveyor flights. In addition, it has been found that in the use of such prior conveyor structures the sprocket chain drives tend to wear out unduly the molded plastic resinous flights with resultant relatively short useful or working life of such conveyor structures.

OBJECTS

An object of the present invention is to provide a new and improved conveyor structure which embodies one or more flexible coated wire cables coated with a flexible plastic resinous coating material, such as nylon, and novel flight-attaching and supporting means for attaching and conveyor flights to and supporting them on or from the flexible coated wire cable or cables and in which such novel flight-attaching and supporting members are integrally united, as by molding or heat-bonding, or the like, to the plastic resinous coating material on the flexible coated wire cable for attaching the conveyor flights to and supporting them on the flexible coated wire cable or cables.

A further object of the invention is to provide a new and improved flexible coated wire cable coated with a flexible plastic resinous coating material, such as nylon, having integrally molded with or bonded to the plastic resinous coating material on the flexible coated wire cable, at spaced intervals axially therealong, novel plastic resinous flight-attaching and supporting means for attaching the conveyor flights to and supporting them on the flexible coated wire cable.

Still another object of the invention is to provide a new and improved flexible coated wire cable conveyor structure and new and improved flexible coated wire cables therefor in which the novel flight-attaching and supporting members for attaching the conveyor flights to and supporting them on the flexible coated wire cable are composed of the same flexible plastic resinous material, such as nylon, as is employed for the plastic resinous coating material on the flexible coated wire cable.

An additional object of the invention is to provide a new and improved flexible coated wire cable conveyor structure which includes one or more flexible coated wire cables coated with a flexible plastic resinous coating material, such as nylon, in which the novel flight-attaching and supporting members for attaching the conveyor flights to and supporting them on the flexible coated wire cable are in the form of flight-attaching and supporting members which are integrally molded with or bonded to the plastic resinous coating material on the flexible coated wire cable at spaced intervals axially therealong, and in which the novel flight-attaching and supporting members are formed as integral radial extensions of the plastic resinous coating on the flexible coated wire cable.

A further object of the invention is to provide a new and improved conveyor structure which embodies one or more flexible wire cables coated with nylon, or like flexible plastic resinous coating material, and which includes relatively light conveyor flights molded of plastic resinous material, and novel flight-attaching means including flight-attaching members which are formed as integral extensions of the plastic resinous coating on the flexible wire cables for attaching the molded plastic resinous flights to the coated flexible wire cable.

Still another object of the invention is to provide a new and improved conveyor structure, as referred to hereinbefore, which is relatively light in weight and which may embody conveyor flights of many different shapes, sizes, lengths and widths, and which may be made in longer lengths than are practical in the use of conveyor structures which include sprocket, or like metal chain drives, due to the relative great weight and shipping expense of such prior chain drive conveyors.

An additional object of the invention is to provide a new and improved conveyor structure which may be made in many different types of conveyors including horizontal conveyors, vertical conveyors, endless top and bottom run conveyors, and the like.

A further object of the invention is to provide, in one and a preferred embodiment thereof, novel means for detachably latching the conveyor flights to the flight-attaching and supporting members.

A further object of the invention is to provide a new and improved conveyor structure which embodies molded plastic resinous conveyor flights which are carried and driven by flexible wire cables coated with nylon, or like flexible plastic resinous coating material, and which in use overcomes a problem experienced in the use of prior conveyor structures which have embodied molded plastic resinous conveyor flights and metal sprocket chain or like metal chain drives which have caused excessive wear on the molded plastic resinous conveyor flights and resultant relatively short useful or working life thereof.

An additional object of the invention is to provide in the new conveyor structure novel latching means for detachably latching each of the conveyor flights to the flight-attaching and supporting means.

Other objects will appear hereinafter.

DESCRIPTION OF FIGURES IN THE DRAWINGS

FIG. 1 is a fragmentary side elevational view of a flexible coated wire cable conveyor structure embodying the present invention;

FIG. 2 is a fragmentary top plan view of the conveyor structure shown in FIG. 1;

FIG. 3 is a fragmentary bottom plan view of the conveyor structure shown in FIGS. 1 and 2;

FIG. 4 is a transverse vertical sectional view of the new flexible coated wire cable conveyor structure shown in FIGS. 1 to 3, inclusive;

FIG. 5 is an enlarged vertical section view, on line 5—5 in FIG. 1, illustrating a typical and preferred embodiment of the new flight-attaching and supporting means for attaching the conveyor flights to and supporting them on the flexible coated wire cable;

FIG. 6 is an enlarged vertical sectional view on line 6—6 in FIG. 4;

FIG. 7 is an exploded perspective view of the parts of the conveyor structure illustrated in FIGS. 1 to 6, inclusive;

FIG. 8 is an exploded view, partly in section, of parts of the new flight-attaching and supporting means embodied in the invention;

FIG. 9 is a side elevational view of the parts of the flight-attaching and supporting means illustrated in FIG. 8 in assembled condition;

FIG. 10 is an end elevational view on line 10—10 in FIG. 9;

FIG. 11 is an end elevational view on line 11—11 in FIG. 9;

FIG. 12 is a fragmentary bottom plan view illustrating a modification of the invention in which the new conveyor structure includes a plurality, shown as two, of the new flexible coated wire cables having the new conveyor flight-attaching and supporting members integrally united to the flexible resinous coating on the flexible coated wire cables;

FIG. 13 is a transverse sectional view on line 13—13 in FIG. 12;

FIG. 14 is a top plan view of a modified form of an endless conveyor structure embodying the present invention;

FIG. 15 is a side elevational view on line 15—15 in FIG. 14;

FIG. 16 is a fragmentary top plan view of the conveyor structure illustrated in FIGS. 14 and 15;

FIG. 17 is a fragmentary side elevational view of the area encircled in FIG. 15;

FIG. 18 is a transverse sectional view on line 18—18 in FIG. 16, illustrating one of the conveyor flights and the coated flexible wire cable and the means for attaching the conveyor flights to the coated flexible wire cable;

FIG. 19 is an enlarged sectional view on line 19—19 in FIG. 16 illustrating the coated flexible wire cable and the flight-attaching and supporting means integrally united thereto;

FIG. 20 is an enlarged fragmentary sectional view, on line 20—20 in FIG. 16, illustrating the coated flexible wire cable and one of the molded plastic resinous conveyor flights and the flight-attaching means therefor;

FIG. 21 is an enlarged sectional detail view, on line 21—21 in FIG. 15, illustrating the manner in which the coated flexible wire cable and the flight-attaching and supporting means integrally united thereto, and the molded plastic resinous conveyor flights, work around one of the pulley drive wheels which are embodied in the endless conveyor structure illustrated in FIGS. 12 to 20, inclusive;

FIG. 22 is an enlarged sectional view, on line 22—22 in FIG. 15, illustrating the manner in which the coated flexible wire cable and flight-attaching and supporting means and the molded plastic resinous conveyor flights work around the other pulley drive wheel which is embodied in the conveyor structure illustrated in FIGS. 14 to 21, inclusive;

FIG. 23 is a fragmentary perspective view of the coated flexible cable and one of the conveyor flights and the flight-attaching and supporting means embodied in the form of the invention illustrated in FIGS. 14 to 22, inclusive;

FIG. 28 is a transverse sectional detail view on line 28—28 in FIG. 24;

FIG. 29 is a transverse sectional detail view on line 29—29 in FIG. 24;

FIG. 30 is an enlarged sectional view on line 30—30 in FIG. 24 illustrating the coated flexible wire cable and the flight-attaching and supporting means integrally united thereto and illustrating the molded plastic resinous conveyor flights integrally united to the flight-attaching and supporting means;

Figure 24:
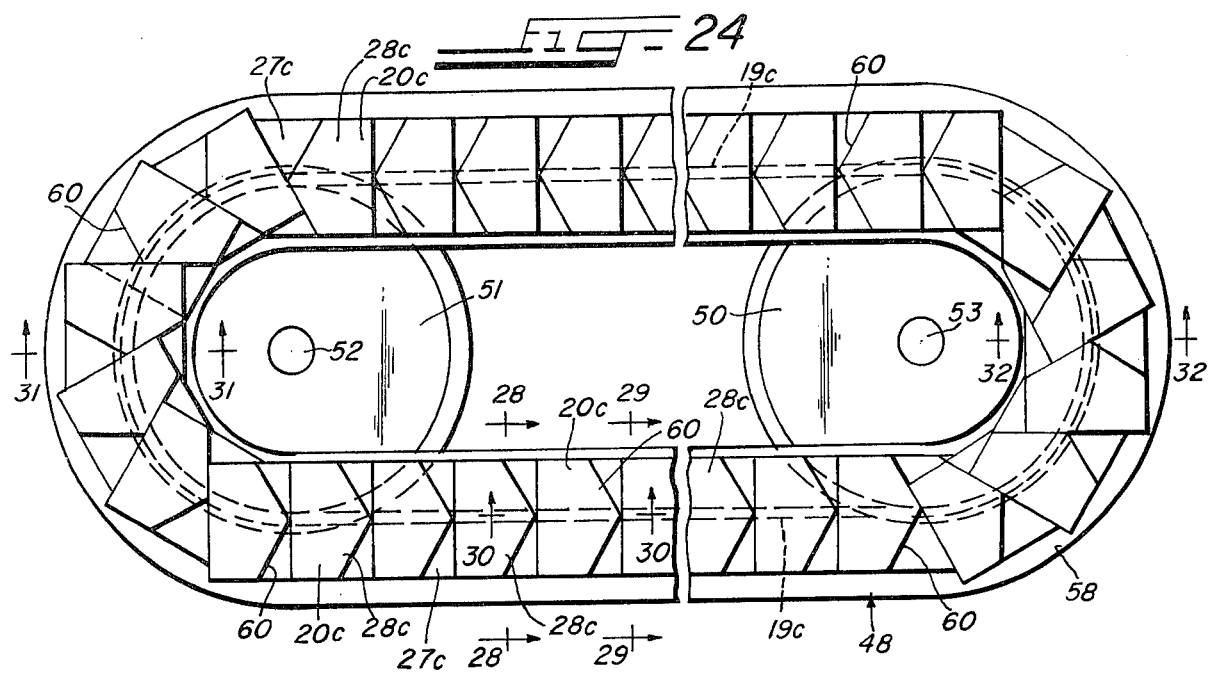
FIG. 24 is a top plan view of an endless horizontal conveyor structure embodying the present invention.
Figure 25:
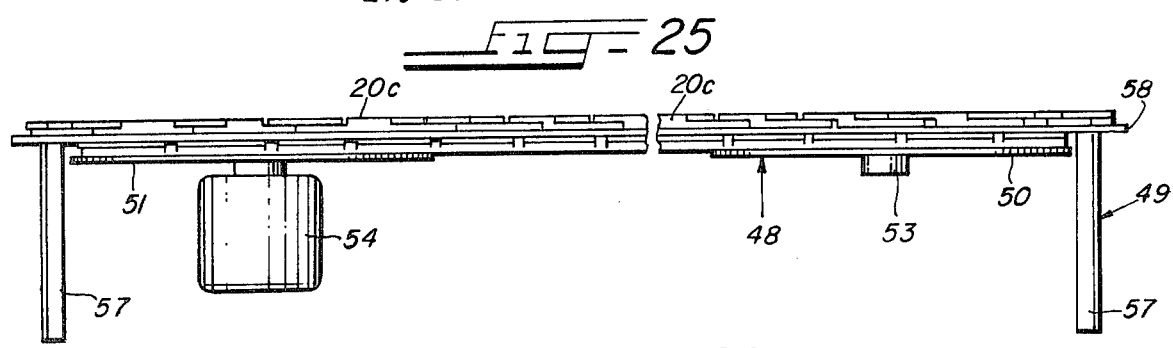
FIG. 25 is a side elevational view of the endless horizontal conveyor structure illustrated in FIG. 24.
Figure 26:
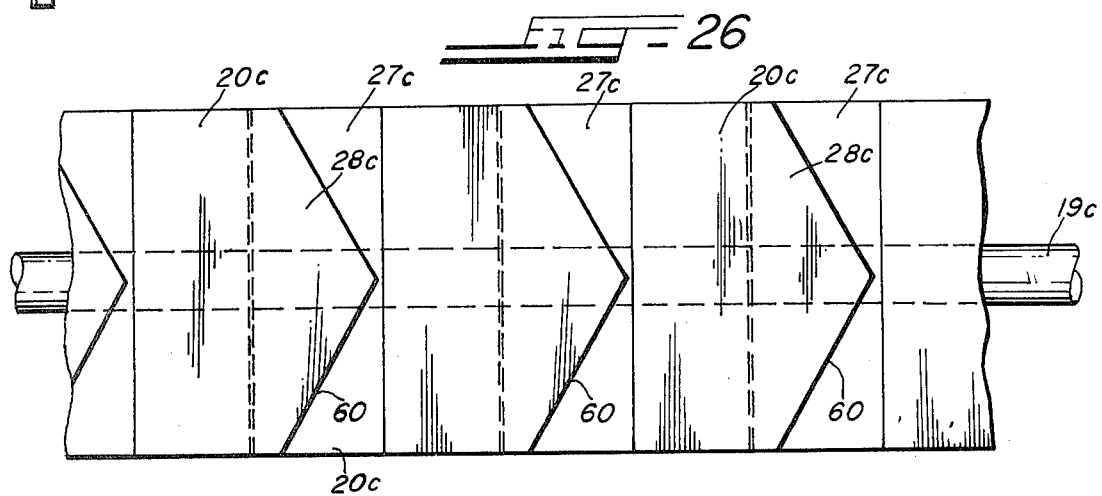
FIG. 26 is a fragmentary top plan view of the horizontal conveyor structure illustrated in FIGS. 24 and 25.
Figure 27:
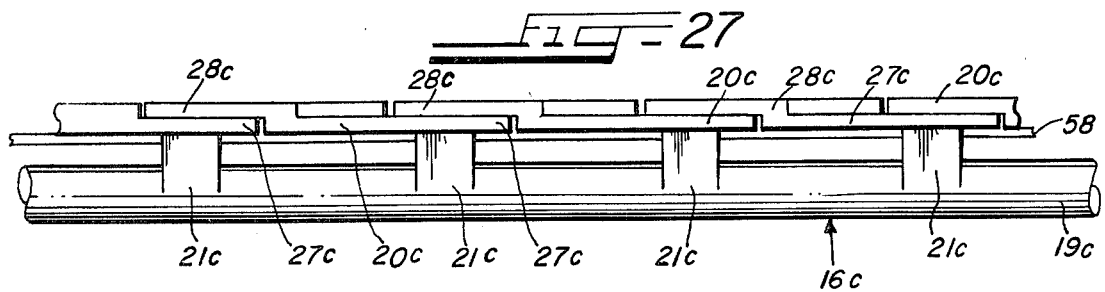
FIG. 27 is a fragmentary side elevational view of the horizontal conveyor structure illustrated in FIGS. 24, 25 and 26.

FIG. 31 is an enlarged sectional detail view, on line 31—31 in FIG. 24, illustrating the manner in which the coated flexible wire cable and flight-attaching and supporting means and the conveyor flights attached thereto work around one of the driving sprockets which are embodied in the form of the invention illustrated in FIGS. 24 to 30, inclusive; and FIG. 32 is an enlarged sectional detail view, on line 32—32 in FIG. 24, illustrating the manner in which the flexible coated wire cable and flight-attaching and supporting means and attached conveyor flights work around the driving sprocket at the other end of the horizontal conveyor structure illustrated in FIGS. 24, 25 and 26.

DETAILED DESCRIPTION OF THE FORM OF THE INVENTION ILLUSTRATED IN FIGS. 1 TO 11, INCLUSIVE

A typical and preferred embodiment of the invention is illustrated in FIGS. 1 to 11, inclusive, of the drawings, wherein it is generally indicated at 15, and is shown as having the form of an endless conveyor structure for conveying articles or things, such as cans, from one point to another, and includes a flexible coated wire cable 16 which includes a body 17 of suitable flexible metal cable wires 18 having thereon and enclosing the body 17 a coating 19 of flexible plastic resinous coating material, such as nylon, or the like (FIG. 5).

The new conveyor structure 15 includes a plurality of article-supporting conveyor flights or sections 20 which are arranged axially along the flexible coated wire cable 16 for supporting thereon articles or things, such as cans, which are being transported by the new conveyor structure 15 from one point to another, and novel flight-attaching and supporting means, generally indicated at 21, for attaching the conveyor flights or sections to the flexible coated wire cable 16.

The flight-attaching and supporting means 21 includes a novel first flight-attaching and supporting member 22 which is formed, as by molding or heat-bonding, as an integral radial extension of the plastic resinous coating 19, such as nylon, on the coated flexible wire cable 16. Each of the flight-attaching and supporting members 22 has a generally T-shaped head 23 which extends into and is seated in a generally rectangular-shaped slot 24 which is formed partly in a second flight-attaching and supporting plate member 25 and partly between two depending extensions of arms 26 which are formed integrally with the body of the second and generally rectangular-shaped flight-attaching and supporting plate member 25 and depend from the bottom surface thereof, as shown in FIGS. 5, 6, 7 and 8 to 11, inclusive.

As shown in FIGS. 6, 8 and 9 of the drawings, each of the second and rectangular-shaped flight-attaching and supporting plate members 25 has a portion 29 at one side thereof and each of these portions 29 has a recess 30 formed therein in its upper surface for the reception of the generally annular-shaped head 31 of a latching device 32 which is attached to the bottom surface of one of the conveyor flights 20, as by welding, or the like.

Each of the latching devices 32 includes a pair of generally hook-shaped flexible and resilient latching arms or elements 33 which may be made of any suitable flexible resilient material, such as steel, or the like. As shown in FIG. 6, the portion 29 of each of the second flight-attaching and supporting plate members 25 includes a bottom wall 34 which has openings 35 formed therein and the flexible resilient hook-shaped metal latching arms or elements 33 in each of the attaching devices 32 project downwardly through one of the openings 35 in one of the second generally rectangular-shaped flight-attaching plate members 25, thereby detachably latching each of the conveyor flights 20 to one of the second flight-attaching and supporting plate members 25.

OPERATION OF THE FORM OF THE INVENTION ILLUSTRATED IN FIGS. 1 TO 11, INCLUSIVE

The form of the invention illustrated in FIGS. 1 to 11, inclusive, of the drawings, may be embodied and used in many different types of conveyors employing flexible coated wire cables, as hereinbefore described, and the new conveyor flight-attaching and supporting members 22 may be integrally united to the nylon or like flexible plastic resinous coating 19 on the coated flexible wire cable 16, as by molding, heat-bonding, or the like, to form integral radial extension of the nylon or like plastic resinous coating 19 on the body portion 17 of the cable.

The conveyor flight-attaching and supporting plate members 25 are attached to the flight-attaching and supporting members 22 by interfitting the T-shaped heads 23 of the first flight-attaching and supporting members 22 into the correspondingly T-shaped slots 24 which are formed partly in the body of the second and generally rectangular-shaped flight-attaching and supporting plate members 25 and partly between the depending extensions or arms 26 thereof (FIGS. 5 and 7). Thus, to effect this engagement, the T-shaped heads 23 are slidably inserted into the T-shaped slots 24 (right to left, FIG. 8) until the end wall 37 on the T-shaped head 23 engages the wall 38 on that portion of the T-shaped slot 24 which is formed in the side portion 29 of the flight-attaching plate member 25 (FIG. 8).

In the use of the form of the invention, as illustrated in FIGS. 1 to 11, inclusive, and as described above, the new flight-attaching and supporting means 21, including the novel first flight-attaching and supporting members 22, which are formed as integral radial extensions of the flexible plastic resinous coating 19 on the flexible coated wire cables 16, in cooperation with the second and generally rectangular-shaped flight-attaching and supporting members 25, and the depending extensions 26 and the generally T-shaped slot 24, provide for an expeditious mounting of the article-supporting conveyor flights 20 on the flexible coated wire cable 16-17-18-19 and provide for adequate strength to resist the stresses and strains to which the new conveyor structure 15 may be subjected in use while, at the same time, preventing tearing or rupturing of the plastic resinous coating 19 on the flexible wire cable 16.

The flexible resilient metal latching arms 33 enable the conveyor flights 20 to be detachably mounted on and latched to the flight-attaching and supporting members 25 and to be manually detached therefrom by manually pressing inwardly on the flexible resilient latching arms 33 from below the flight-attaching and supporting members 25 and then manually lifting the conveyor flight 20 off the flight-attaching the supporting member 25 (FIGS. 6 and 7).

THE MODIFICATION ILLUSTRATED IN FIGS. 12 and 13

A first modification of the invention is illustrated in FIGS. 12 and 13 of the drawings and those parts thereof which are similar to or correspond to parts in the form of the invention illustrated in FIGS. 1 to 11, inclusive, have been given the same reference numerals followed by the additional and distinguishing reference character "a".

The form of the invention illustrated in FIGS. 12 and 13 of the drawings is substantially the same as that illustrated in FIGS. 1 to 11, inclusive, of the drawings, and differs therefrom only in that in this form of the invention a plurality, shown as two, of the coated flexible wire cable 16a are employed for supporting each conveyor flight 20a, and in this form of the invention, the coated flexible wire cables 16a are arranged in coplanar and parallel relationship, as shown in FIGS. 12 and 13, and each of the flight-attaching and supporting plate members 25a is provided with a plurality of laterally spaced T-shaped slots 24a for the reception of the generally T-shaped heads 23a of the molded plastic resinous flight-attaching and supporting members 22a on the coated flexible wire cables 16a (FIG. 9).

THE CONSTRUCTION OF THE FORM OF THE INVENTION ILLUSTRATED IN FIGS. 14 TO 23, INCLUSIVE

A second modification and typical use of the invention is illustrated in FIGS. 14 to 23, inclusive, of the drawings, and those parts thereof which are similar to or correspond to parts in the form of the invention illustrated in FIGS. 1 to 11, inclusive, have been given similar reference numerals followed by the additional and distinguishing reference character "b".

The modification and typical use of the invention, as illustrated in FIGS. 12 to 13, inclusive, is shown as being in the form of an endless conveyor, which is generally indicated at 37, and includes a supporting frame 38 on which a drive pulley 39 and a driven pulley 40 are rotatably mounted on supporting shafts 41 and 42 which, in turn, are rotatably mounted in suitable bearing structures 43 and 44, respectively.

As shown in FIGS. 15, 21 and 22, the flexible coated wire cable 16b works around and in annular peripheral grooves 45 and 46 which are formed in the pulleys 39 and 40, respectively, and the endless conveyor structure 15b is driven by suitable power means in the form of an electrical motor 47 which is operatively connected to the drive shaft 41 for the driving pulley 39 (FIG. 14).

THE OPERATION OF THE FORM OF THE INVENTION ILLUSTRATED IN FIGS. 14 TO 23, INCLUSIVE

In the use of the form of the invention illustrated in FIGS. 14 to 23, inclusive, each of the flight-attaching and supporting members 21b is formed as a single body or member which is formed as an integral radial extension of the plastic resinous coating 19b on the flexible wire cable 16b-17b-18b-19b as by molding, heat-bonding, or the like, and the flight members 20b are molded of plastic resinous material, such as nylon, and are integrally united to the flight-attaching and supporting members 21b in any suitable manner, as by molding, heat-bonding, or the like.

When the parts of the endless conveyor shown in FIGS. 14 to 23, inclusive, are assembled, as shown, and the conveyor is operated by the power means 47, drive shafts 41 and 42, drive pulley 39 and driven pulley 40, and the coated flexible wire cable 16b-17b-18b-19b, the flexible coated wire cable 16b-17b-18b-19b works in the annular peripheral grooves 45 and 46 of the pulleys 39 and 40, respectively, and the flight-attaching and supporting members 21b and attached conveyor flights 20b are carried by the coated flexible wire cable 19b around the drive pulley 39 and the driven pulley 40 tangentially relative thereto, as illustrated in FIG. 15.

THE CONSTRUCTION OF THE FORM OF THE INVENTION ILLUSTRATED IN FIGS. 24 TO 32, INCLUSIVE

Another embodiment and typical use of the invention are illustrated in FIGS. 24 to 32, inclusive, of the drawings, and those parts thereof which are similar to or correspond to parts of the invention illustrated in FIGS. 1 to 13, inclusive, of the drawings, have been given the same reference numerals followed by the additional and distinguishing reference character "c".

The form of the invention illustrated in FIGS. 24 to 32, inclusive, is shown as being in the form of an oval-shaped horizontal endless conveyor, generally indicated at 48, and having a preselected geometrical form or pattern, shown as oval-shaped, and which includes a supporting frame, generally indicated at 49, and on which a pair of spaced horizontally disposed driving sprocket members 50 and 51 are rotatably mounted, as at 52 and 53, respectively, and are rotatably driven by power means in the form of an electric motor 54 and suitable power transmission means (not shown). As shown in FIGS. 24, 25, 28, 29, 30, 31 and 32 of the drawings, the supporting frame 49 includes upright supporting legs 57 on which an oval-shaped generally flat horizontal supporting and guide table 58 is mounted, and is disposed between the coated flexible wire cable 16c and the conveyor flights 20c (FIGS. 28 and 29). As shown in FIGS. 28 and 29, the generally flat, horizontal supporting and guide table 58 has an oval-shaped endless slot 59 formed therein and the flight-attaching members 21c project upwardly through and travel in the oval-shaped endless slot 59.

As shown in FIGS. 31 and 32, the driving sprocket member 51 includes a body having an annular peripheral groove 56 formed therein and the driven sprocket member 50 has a similar annular peripheral groove 55 formed therein.

As shown in FIGS. 24 and 26 of the drawings, each of the overlapping upper parts 28c of the conveyor flights 20c, projects over a complementary underlying part or extension 27c of the next adjacent conveyor flight 20c and each of the overlapping parts 28c, has a V-shaped front edge portion 60 which projects over the underlying lower part or extension 27c of the next adjacent conveyor flight 20c.

In this form of the invention, the flight-attaching and supporting members 21c are similar to and correspond to the flight-attaching and supporting members 21 in the form of the invention illustrated in FIGS. 14 to 23, inclusive.

THE OPERATION AND USE OF THE FORM OF THE INVENTION ILLUSTRATED IN FIGS. 24 TO 32, INCLUSIVE

In the use of the form of the invention as embodied in the endless oval-shaped horizontal conveyor structure illustrated in FIGS. 24 to 32, inclusive, when the motor 54 is energized it drives the sprocket member 51 which, in turn, transmits power through the endless coated cable 16c which works in and around the annular peripheral grooves 56 and 55 in the sprocket members 51 and 50, respectively, thereby driving the conveyor flights 20c and causing them to move over the endless oval-shaped table 58. During this operation, as shown in FIGS. 28 and 29, the flight-attaching and supporting members 21c travel in and through the oval-shaped endless slot 59 in the generally flat horizontal supporting and guide table 58, thereby causing the conveyor flights 20c to move over and around the horizontal table 58, with the overlapping upper portion 28c of each of the conveyor flights 20c sliding over the underlying part or extension 27c of the next adjacent conveyor flight 20c as the conveyor flights 20c make the turns at opposite ends of the oval-shaped horizontal table 58.

It will thus be seen from the foregoing description, considered in conjunction with the accompanying drawings, that the present invention provides a new and improved coated flexible wire cable conveyor structure and new and improved flight-attaching and supporting means therefor including flight-attaching and supporting members which are integrally united and to the plastic resinous coating on the flexible wire cables, as by molding, heat-bonding, or the like, for attaching the article carrying sections or conveyor flights to and supporting them upon the coated flexible wire cable or cables.

I claim:

1. A conveyor structure comprising:
 (a) a coated flexible wire cable including
  (1) a body of flexible cable wires having thereon
  (2) a coating of flexible plastic resinous material;

(b) a plurality of conveyor flights or sections arranged at spaced intervals axially along the said coated flexible wire cable and each including
   (1) a body having opposed surfaces including
      a. a first and article-carrying surface; and
      b. a second and attaching surface opposite the said first and article-carrying surface;
(c) flight-attaching means for attaching the said body of each of the said conveyor flights to the said coated flexible wire cable for movement therewith including
   (1) a first and plastic resinous attaching member integrally united to the said coating of flexible plastic resinous material on the said body of the said coated flexible wire cable; and
   (2) second attaching means separate from the said first and plastic resinous attaching member for attaching the said plastic resinous attaching member to the said second and attaching surface of the said body of each of the said conveyor flights or sections.

2. A conveyor structure as defined in claim 1 in which
   (a) the said body of flexible cable wires and the said coating of flexible plastic resinous material thereon are generally cylindrical and similar in cross-sectional form; and in which
   (b) the said first and plastic resinous attaching member is in the form of an integral radial extension of the said generally cylindrical coating of plastic resinous material on the said body of the said coated flexible wire cable.

3. A conveyor structure as defined in claim 2 in which
   (a) the said first and plastic resinous attaching member is integrally molded to the said coating of plastic resinous material on the said body of the said flexible wire cable.

4. A conveyor structure as defined in claim 2 in which
   (a) the said first and plastic resinous attaching member is integrally bonded to the said coating of plastic resinous material on the said body of the said flexible wire cable.

5. A conveyor structure as defined in claim 1 in which the said first and plastic resinous attaching member is in the form of
   (a) a first and generally T-shaped attaching element; and in which
   (b) the said flight-attaching means includes
      (1) a second attaching member disposed between and separate from the said second and attaching surface of the said body of each of the said conveyor flights and the said coated flexible wire cable; and in which
      (2) the said second attaching member has formed therein
         a. a generally T-shaped slot in which the said first and generally T-shaped attaching element is detachably mounted.

6. A conveyor structure as defined in claim 1 which includes
   (a) a plurality of said conveyor flights arranged axially in spaced relationship along the said coated flexible wire cable;
   (b) a plurality of said flight-attaching means arranged in spaced relationship along the said coated flexible wire cable; and each of said flight-attaching means including
   (c) a plurality of said first and plastic resinous attaching members integrally united to the said coating of flexible plastic resinous material on the said body of the said coated flexible wire cable.

7. A conveyor structure as defined in claim 1 in which each of the said first and plastic resinous attaching members is integrally molded to and as an integral part of the said coating of flexible plastic resinous material on the said body of the said coated flexible wire cable.

8. A conveyor structure as defined in claim 1 in which each of the said first and plastic resinous attaching members is integrally bonded to and forms an integral part of the said coating of flexible plastic resinous material on the said body of the said coated flexible wire cable.

9. A conveyor structure comprising:
   (a) a coated flexible wire cable including
      (1) a body of flexible cable wires having thereon
      (2) a coating of flexible plastic resinous material;
   (b) a plurality of conveyor flights or sections arranged axially in spaced relationship along the said coated flexible wire cable;
   (c) a plurality of flight-attaching means arranged axially in spaced relationship along the said flexible coated wire cable for attaching each of the said conveyor flights to the said coated flexible wire cable for movement therewith including
      (1) a first plastic resinous flight-attaching member integrally united to the said coating of flexible plastic resinous material on the said body of the said flexible wire cable;
      (2) a second flight-attaching member having the said first flight-attaching member attached thereto; and
   (d) latching means for latching each of the said second flight-attaching members to one of the said conveyor flights.

10. A conveyor structure as defined in claim 9 which includes
   (a) a plurality of the said coated flexible wire cables arranged in spaced but generally parallel and coplanar relationship with each other; and
   (b) a row of the said flight-attaching means arranged in spaced relationship axially along each of the said flexible coated wire cables for attaching each of the said conveyor flights to one of the said flexible coated wire cables.

11. A conveyor structure comprising
   (a) a flexible wire cable including
      (1) a body of flexible cable wires having thereon
      (2) a coating of flexible plastic resinous material;
   (b) a row of conveyor flights arranged in spaced relationship axially along the said flexible wire cable;
   (c) a plurality of first attaching members arranged in spaced relationship axially along the said flexible wire cable and each composed of a body of plastic resinous material integrally united to the said coating of flexible plastic resinous material on the said body of flexible cable wires; and
   (d) a second attaching member separate from and for detachably attaching each of the said first and plastic resinous attaching members to one of the said conveyor flights.

12. A conveyor structure comprising (a) a flexible wire cable including
  (1) a body of flexible cable wires having thereon
  (2) a coating of flexible plastic resinous material;
(b) a row of conveyor flights arranged in spaced relationship axially along the said flexible wire cable;
(c) a plurality of first attaching members arranged in spaced relationship axially along the said flexible wire cable and each composed of a body of plastic resinous material integrally united to the said coating of flexible plastic resinous material on the said body of flexible cable wires; and
(d) a second attaching member separate from and for detachably attaching each of the said first and plastic resinous attaching members to one of the said conveyor flights; and each of said attaching members including
(e) a portion having therein and extending therethrough
  (1) a latching opening; and in which the said conveyor structure includes
  (2) a flexible, resilient latching member attached to and depending from each of the said conveyor flights and latchingly engaged in and extending through the said latching opening.

13. A conveyor structure comprising
(a) a flexible wire cable including
  (1) a body of flexible cable wires having thereon
  (2) a coating of flexible plastic resinous material;
(b) a row of conveyor flights arranged in spaced relationship axially along the said flexible wire cable;
(c) a plurality of first attaching members arranged in spaced relationship axially along the said flexible wire cable and each composed of a body of plastic resinous material integrally united to the said coating of flexible plastic resinous material on the said body of flexible cable wires;
(d) a second attaching member separate from and for detachably attaching each of the said first and plastic resinous attaching members to one of the said conveyor flights; and each of the said second attaching members including
(e) a portion having therein and extending therethrough
  (1) a plurality of latching openings; and the said conveyor structure including
  (2) a plurality of flexible, resilient latching members each attached to and depending from one of the said conveyor flights and each latchingly engaged in and extending through one of the said latching openings.

14. A conveyor structure comprising
(a) a flexible wire cable including
  (1) a body of flexible cable wires having thereon
  (2) a coating of flexible plastic resinous material;
(b) a row of conveyor flights arranged in spaced relationship axially along the said flexible wire cable;
(c) a plurality of first attaching members arranged in spaced relationship axially along the said flexible wire cable and each composed of a body of plastic resinous material integrally united to the said coating of flexible plastic resinous material on the said body of flexible cable wires;
(d) a second attaching member separate from and for detachably attaching each of the said first and plastic resinous attaching members to one of the said conveyor flights; each of the said second attaching members including
(e) a portion having therein and extending therethrough
  (1) a plurality of latching openings; and the said conveyor structure including
  (2) a plurality of flexible, resilient latching members each attached to and depending from one of the said conveyor flights and each latchingly engaged in and extending through one of the said latching openings;
(f) each of the said flexible, resilient latching members including
  (1) a manually operable lower end portion extending below one of the said second attaching members and latchingly engaged with one of the said second attaching members; and
(g) the said manually operable lower end portion of each of the said flexible, resilient latching members being manually movable out of latching engagement with one of the said second attaching members to enable the said conveyor flight to be manually removed from one of the said second attaching members.

* * * * *